United States Patent
Hamlin et al.

(10) Patent No.: US 11,722,460 B2
(45) Date of Patent: Aug. 8, 2023

(54) NETWORK MANAGEABILITY TECHNIQUES FOR INTELLIGENT CONNECTIVITY

(71) Applicant: Dell Products, L.P., Round Rock, TX (US)

(72) Inventors: Daniel L. Hamlin, Round Rock, TX (US); Vivek Viswanathan Iyer, Austin, TX (US); Manuel Novoa, Leander, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/187,356

(22) Filed: Feb. 26, 2021

(65) Prior Publication Data
US 2022/0278959 A1 Sep. 1, 2022

(51) Int. Cl.
H04L 9/40 (2022.01)
G06F 1/16 (2006.01)
H04L 67/10 (2022.01)
H04L 67/63 (2022.01)

(52) U.S. Cl.
CPC ........ *H04L 63/0263* (2013.01); *G06F 1/1632* (2013.01); *H04L 67/10* (2013.01); *H04L 67/63* (2022.05)

(58) Field of Classification Search
CPC ..... H04L 63/0263; H04L 67/10; H04L 67/63; G06F 1/1632
See application file for complete search history.

(56) References Cited

U.S. PATENT DOCUMENTS

| | | | |
|---|---|---|---|
| 2012/0265913 A1* | 10/2012 | Suumaki | H04W 76/14 710/303 |
| 2013/0254831 A1* | 9/2013 | Roach | H04W 12/082 726/1 |
| 2015/0011160 A1* | 1/2015 | Jurgovan | H04B 5/0031 455/41.1 |
| 2020/0021984 A1* | 1/2020 | Nagao | H04W 48/18 |
| 2020/0304543 A1* | 9/2020 | Hamlin | H04L 63/108 |

FOREIGN PATENT DOCUMENTS

| | | | | |
|---|---|---|---|---|
| WO | WO-02096069 A2 * | 11/2002 | ......... | B60R 11/0241 |
| WO | WO-2012018556 A3 * | 8/2012 | ......... | G06F 16/9574 |
| WO | WO-2013173064 A1 * | 11/2013 | ......... | H04L 63/1416 |
| WO | WO-2015116681 A1 * | 8/2015 | ........... | H04L 45/306 |

* cited by examiner

*Primary Examiner* — Cheikh T Ndiaye
(74) *Attorney, Agent, or Firm* — Fogarty LLP

(57) ABSTRACT

Systems and systems for implementing network manageability techniques that enable intelligent connectivity are described. In an embodiment, an Information Handling System (IHS) may include a processor and a memory coupled to the processor, the memory having program instructions stored thereon that, upon execution by the processor, cause the IHS to: determine that a rule prescribed by a connectivity policy is satisfied by context information collected by the IHS, and, in response to the determination, change at least one of: a wireless communication channel, a protocol, or a network configuration used by the IHS to connect to a wireless docking station.

20 Claims, 7 Drawing Sheets

NETWORK MANAGEABILITY TECHNIQUES FOR INTELLIGENT CONNECTIVITY

FIELD

The present disclosure relates generally to Information Handling Systems (IHSs), and more particularly, to systems and methods for implementing network manageability techniques that enable intelligent connectivity.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for implementing network manageability techniques that enable intelligent connectivity are described. In an illustrative, non-limiting embodiment, an Information Handling System (IHS) may include a processor and a memory coupled to the processor, the memory having program instructions stored thereon that, upon execution by the processor, cause the IHS to: determine that a rule prescribed by a connectivity policy is satisfied by context information collected by the IHS, and, in response to the determination, change at least one of: a wireless communication channel, a protocol, or a network configuration used by the IHS to connect to a wireless docking station.

For example, the context information may include at least one of: an identity of the user, a time-of-day, a calendar event, or a type of calendar event. Additionally, or alternatively, the context information may include at least one of: an application currently under execution, a duration of execution of an application, a mode of execution of an application, or a priority of an application. Additionally, or alternatively, the context information may include at least one of: a user's proximity to the IHS, or a location of the IHS.

Additionally, or alternatively, the context information may include at least one of: a power mode, or a battery charge level. Additionally, or alternatively, the context information may include a proximity of the IHS to the wireless docking station. Additionally, or alternatively, the context information may include at least one of: an IHS posture, hinge angle, or lid state. Additionally, or alternatively, the context information may be collected, at least in part, via one or more hardware sensors coupled to the IHS.

The program instructions, upon execution, may further cause the IHS to receive the connectivity policy from a backend service over a network.

In another illustrative, non-limiting embodiment, a method may include: receiving, at a wireless docking station, a connectivity policy from a backend service over a network; determining that a rule in the connectivity policy is satisfied by context information collected via one or more IHSs in communication with the wireless docking station; and in response to the determination, changing at least one of: a wireless communication channel, a protocol, or a network configuration used by one or more of the IHSs to connect to the wireless docking station.

For example, the context information may include at least one of: an application currently under execution, a duration of execution of an application, a mode of execution of an application, or a priority of an application. Additionally, or alternatively, the context information may include at least one of: an identity of the user, a time-of-day, a calendar event, or a type of calendar event. Additionally, or alternatively, the context information may include at least one of: a location of the wireless docking station, or a proximity of each IHS relative to the wireless docking station.

Additionally, or alternatively, the context information may include at least one of: a power mode of each IHS, or a battery charge level of each IHS. Additionally, or alternatively, the context information may include at least one of: a posture, a hinge angle, or a lid state of each IHS.

In yet another illustrative, non-limiting embodiment, a memory storage device may have program instructions stored thereon that, upon execution by one or more processors of an IHS, cause the IHS to: receive a connectivity policy from a backend service over a network; determine that a rule in the connectivity policy is satisfied by context information collected by the IHS; and in response to the determination, change at least one of: a wireless communication channel, a protocol, or a network configuration used by the IHS to connect to a wireless display.

For example, the context information may include at least one of: an identity of the user, a time-of-day, a calendar event, or a type of calendar event. Additionally, or alternatively, the context information may include at least one of: a user's proximity to the IHS, a location of the IHS, or a proximity of the IHS relative to the wireless display. Additionally, or alternatively, the context information may include at least one of: a power mode of the IHS, or a battery charge level of the IHS. Additionally, or alternatively, the context information may include at least one of: an IHS posture, hinge angle, or lid state.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
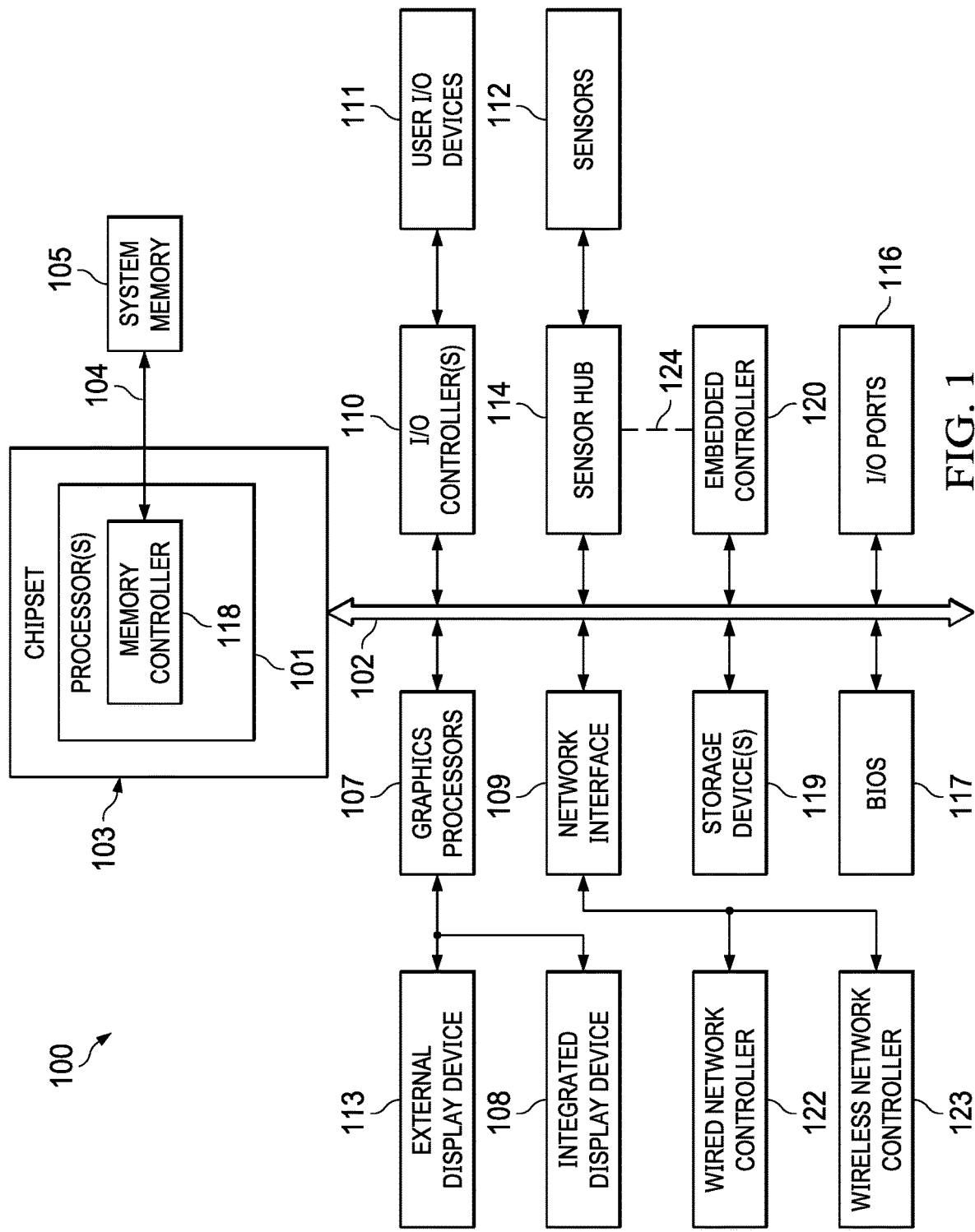
FIG. 1 is a block diagram of an example of an Information Handling System (IHS) configured to implement network manageability techniques that enable intelligent connectivity, according to some embodiments.

Systems and methods are described herein for implementing network manageability techniques that enable intelligent connectivity. In some embodiments, these systems and methods may provide a service set that distributes network management configurations onto Information Handling Systems (IHSs) and peripheral devices or other endpoint Operating Systems (OSs) to deliver identified and prioritized policy configuration and alignment orchestration between them.

In some implementations, an IHS service may collect policy information from a network service, configure hardware and/or software settings based on a policy, and perform runtime evaluation of network transport characteristics to enable feature capability as described and allowed by the policy per user, application, and/or connection. Similarly, a wireless docking station ("wireless dock," "dock," or "docking station"), peripheral device, and/or other endpoint may have its own OS service configured to collect policy information from a network service, configure hardware and/or software settings based on a policy, and perform runtime evaluation of network transport characteristics to enable feature compatibility as described and allowed by the policy per user, application, and/or connection.

Moreover, service components may detect modifications in the environment at runtime and may communicate those modifications to a peer service (e.g., between an IHS and a wireless dock) via side-band management interface to implement configuration modifications that deliver certain prescribed behavioral operations. Session network management may be configured and instructed by the IHS's OS and/or the peripheral device's OS. Arbitration and alignment of IHSs' and peripherals' management policies enforce defined thresholds for data transfers and/or resource usage, which may dynamically modify runtime network management functionality to ensure improved or optimized ecosystem behavior.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

FIG. 1 is a block diagram illustrating components of IHS 100 configured to implement network manageability techniques that enable intelligent connectivity. As shown, IHS 100 includes one or more processors 101, such as a Central Processing Unit (CPU), that execute code retrieved from system memory 105. Although IHS 100 is illustrated with single processor 101, other embodiments may include two or more processors, that may each be configured identically, or to provide specialized processing operations. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor 101 includes an integrated memory controller 118 that may be implemented directly within the circuitry of processor 101, or memory controller 118 may be a separate integrated circuit that is located on the same die as processor 101. Memory controller 118 may be configured to manage the transfer of data to and from the system memory 105 of IHS 100 via high-speed memory interface 104. System memory 105 that is coupled to processor 101 provides processor 101 with a high-speed memory that may be used in the execution of computer program instructions by processor 101.

Accordingly, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, system memory 105 may include multiple removable memory modules.

IHS 100 utilizes chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100.

In certain embodiments, chipset 103 may additionally utilize one or more I/O controllers 110 that may each support the operation of hardware components such as user I/O devices 111 that may include peripheral components that are physically coupled to I/O port 116 and/or peripheral components that are wirelessly coupled to IHS 100 via network interface 109. In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 that may support different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controllers 122 and wireless network controllers 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor 107. Graphics processor 107 may be included within a video card, graphics card or within an embedded controller installed within IHS 100. Additionally, or alternatively, graphics processor 107 may be integrated within processor 101, such as a component of a system-on-chip (SoC). Graphics processor 107 may generate display information and provide the generated information to one or more display device(s) 108 and/or 113, coupled to IHS 100.

One or more display devices 108 and/or 113 coupled to IHS 100 may utilize LCD, LED, OLED, or other display technologies. Each display device 108 and 113 may be capable of receiving touch inputs such as via a touch controller that may be an embedded component of the display device 108 and/or 113 or graphics processor 107, or it may be a separate component of IHS 100 accessed via bus 102. In some cases, power to graphics processor 107, integrated display device 108 and/or external display 133 may be turned off or configured to operate at minimal power levels in response to IHS 100 entering a low-power state (e.g., standby).

As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100. Additionally, or alternatively, external display 113 may be a wireless display. In some cases, display 113 may be shared across two or more IHSs (e.g. in a conference room).

In certain scenarios, the operation of integrated displays 108 and external displays 113 may be configured for a particular user or application. For instance, a particular user or application may prefer specific brightness settings that may vary the display brightness based on time of day and ambient lighting conditions, differently than other users or applications.

Chipset 103 also provides processor 101 with access to one or more storage devices 119. In various embodiments, storage device 119 may be integral to IHS 100 or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. BIOS 117 instructions may also load an OS (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle, deformation, bending, direction, movement, velocity, rotation, acceleration, bag state (in or out of a bag), and/or lid sensor(s) (open or closed).

In some cases, one or more sensors 112 may be part of a keyboard or other input device. Processor 101 may be configured to process information received from sensors 112 through sensor hub 114, and to perform methods for implementing network manageability techniques that enable intelligent connectivity using contextual information obtained from sensors 112.

For instance, during operation of IHS 100, the user may open, close, flip, swivel, or rotate display 108 to produce different IHS postures. In some cases, processor 101 may be configured to determine a current posture of IHS 100 using sensors 112. For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For example, in a laptop posture, a first display surface of a first display 108 may be facing the user at an obtuse angle with respect to a second display surface of a second display 108 or a physical keyboard portion. In a tablet posture, a first display 108 may be at a straight angle with respect to a second display 108 or a physical keyboard portion. And, in a book posture, a first display 108 may have its back resting against the back of a second display 108 or a physical keyboard portion.

It should be noted that the aforementioned postures, and their various respective keyboard states, are described for sake of illustration. In different embodiments, other postures may be used and detected, for example, depending upon the type of hinge coupling the displays, the number of displays used, or other accessories.

In other cases, processor 101 may process user presence data received by sensors 112 and may determine, for example, whether an IHS's end-user is present or absent. Moreover, in situations where the end-user is present before IHS 100, processor 101 may further determine a distance of the end-user from IHS 100 continuously or at pre-determined time intervals. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor 101 may receive and/or produce system context information using sensors 112 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor 101, and it may communicate with chipset 103 via a bus connection such as an Inter-Integrated Circuit (I²C) bus or other suitable type of bus connection. Sensor hub 114 may also utilize an I²C bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main processors 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

Figure 3:
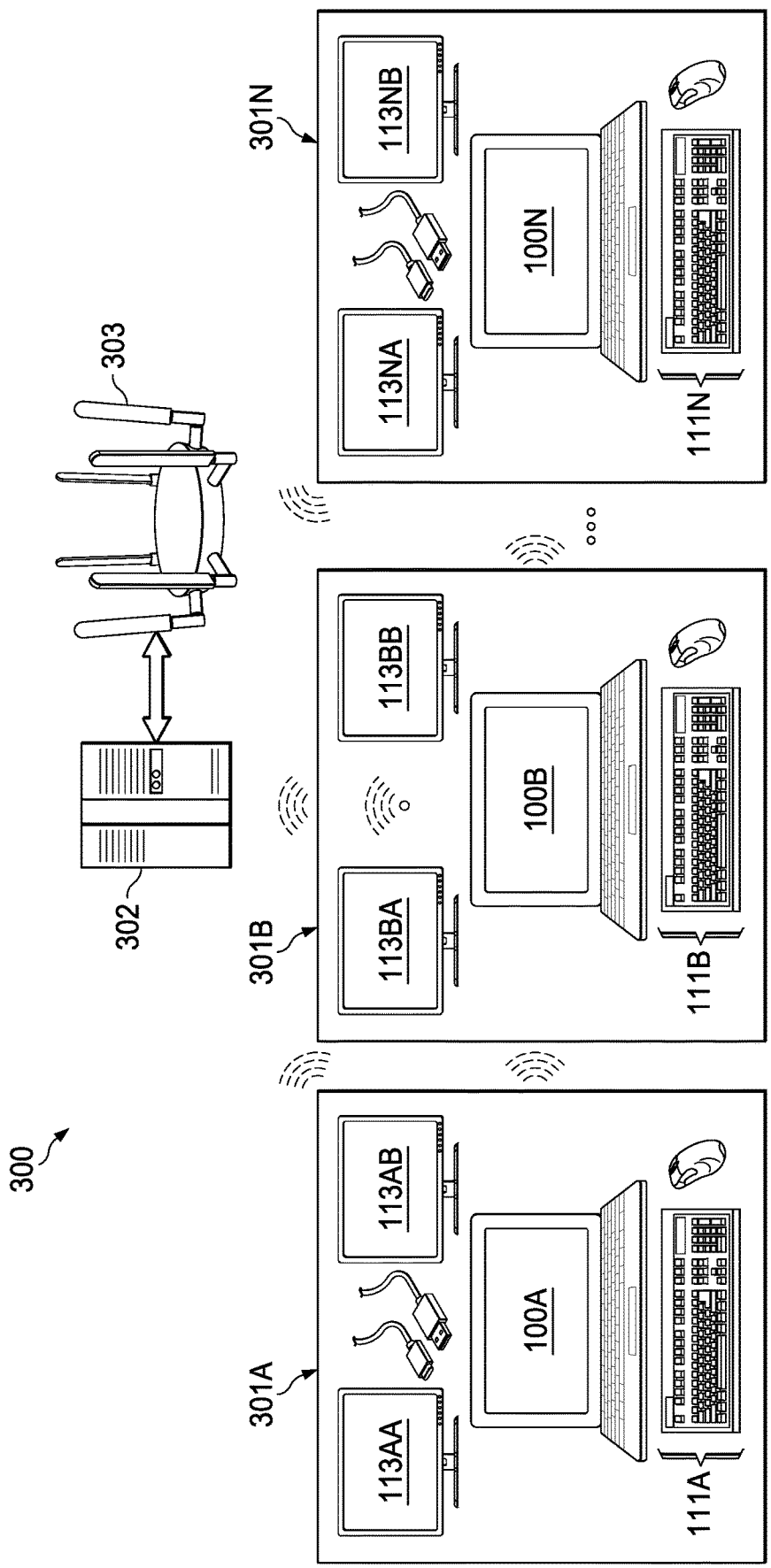
FIG. 3 is a diagram illustrating an example use-case for intelligent connectivity among a plurality of IHSs and a wireless docking station, according to some embodiments.

Generally, user input devices 111 and/or external display 113 may be wireless devices. These wireless devices may be in communication with IHS 100 via wireless network controller 123, via a wireless docking station (as shown in FIG. 3), and/or via an access point (AP). Moreover, these wireless devices may be shared across two or more IHSs, and each such wireless device may be in communication with a given IHS over a different communication channel and/or a different protocol (e.g., Bluetooth or "BT," BT Low-Energy or "BLE," WiFi, WiFi direct, mesh network/protocols, peer-to-peer or "P2P" network/protocols, cellular network/protocols, etc.).

In certain embodiments, the type of protocol, the communication channel, and or its configuration(s) (e.g., Quality-of-Service or "QoS" indicator, bandwidth, latency, security, error correction, priority, authentication, etc.) may be dynamically selected using an applicable policy associated with the wireless device or IHS and/or based upon context information collected by an IHS and/or by the wireless device itself. In some cases, IHS and/or wireless device may have a respective policy delivered to it by a backend service (e.g., controlled by an IT decision maker or "ITDM") that may be updated or modified using machine learning (ML) and/or artificial intelligence (AI) techniques.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as an SoC.

Figure 2:
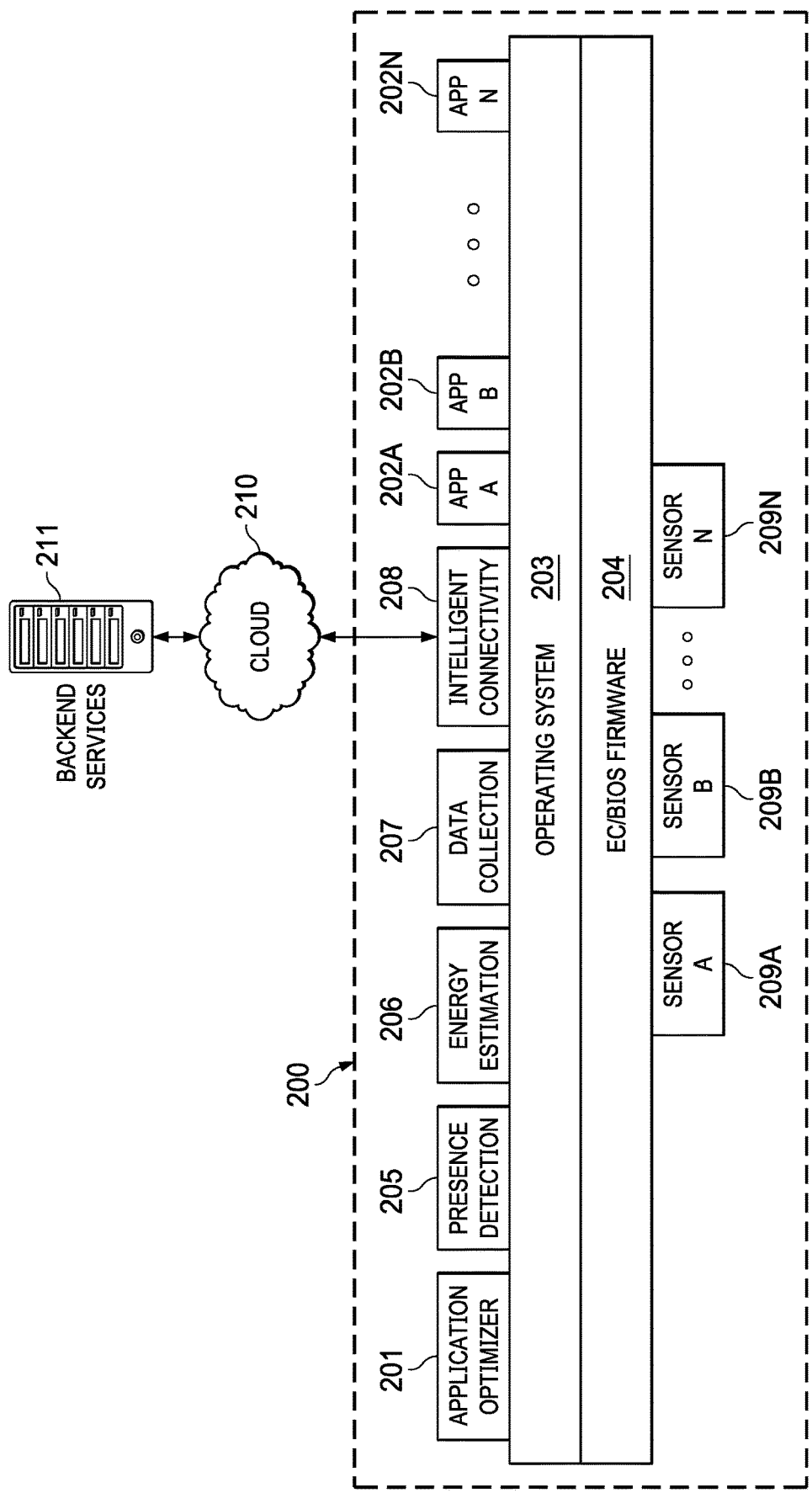
FIG. 2 is a block diagram illustrating an example of a software system configured to implement network manageability techniques that enable intelligent connectivity, according to some embodiments.

FIG. 2 is a block diagram illustrating an example of software system 200 produced by IHS 100 for implementing network manageability techniques that enable intelligent connectivity. In some embodiments, each element of software system 200 may be provided by IHS 100 through the execution of program instructions by one or more logic components (e.g., CPU 100, BIOS 117, EC 120, etc.) stored in memory (e.g., system memory 105), storage device(s) 119, and/or firmware 117, 120.

As shown, software system 200 includes application optimizer engine 201 configured to manage the performance optimization of applications 202A-N. An example of application optimizer engine 201 is the DELL PRECISION OPTIMIZER Meanwhile, examples of applications 202A-N include, but are not limited to, computing resource-intensive applications such as remote/video conferencing applications, video editors, image editors, sound editors, video games, etc.; as well as less resource-intensive applications, such as media players, web browsers, document processors, email clients, etc.

Both application optimizer engine 201 and applications 202A-N are executed by OS 203, which is in turn supported by EC/BIOS instructions/firmware 204. EC/BIOS firmware 204 is in communication with, and configured to receive data collected by, sensor modules or drivers 209A-N—which may abstract and/or interface with respective ones of sensors 112, including any suitable combination of any of the contextual sensors described herein.

In various embodiments, software system 200 includes presence detection module or application programming interface (API) 205, energy estimation engine or API 206, data collection module or API 207, and intelligent connectivity module 208 executed above OS 203.

Presence detection module 205 may process user presence data received by one or more of sensor modules 209A-N and it may determine, for example, whether an IHS's end-user is present or absent. Moreover, in cases where the end-user is present before the IHS, presence detection module 205 may further determine a distance of the end-user from the IHS continuously or at pre-determined time intervals. The detected or calculated distances may be used by presence detection module 205 to classify the user as being in the IHS's near-field, mid-field, or far-field.

Energy estimation engine 206 may include, for example, the MICROSOFT E3 engine, which is configured to provide energy usage data broken down by applications, services, tasks, and/or hardware in an IHS. In some cases, energy estimation engine 206 may use software and/or hardware sensors configured to determine, for example, whether any of applications 202A-N are being executed in the foreground or in the background (e.g., minimized, hidden, etc.) of the IHS's graphical user interface (GUI).

Data collection engine 207 may include any data collection service or process, such as, for example, the DELL DATA VAULT configured as a part of the DELL SUPPORT CENTER that collects information on system health, performance, and environment. In some cases, data collection engine 207 may receive and maintain a database or table that includes information related to IHS hardware utilization (e.g., by application, by thread, by hardware resource, etc.), power source (e.g., battery relative state-of-charge (RSOC), AC-plus-DC state, AC-only state, or DC-only state), etc.

In operation, application optimizer engine 201 monitors applications 202A-N executing on IHS 100. Particularly, application optimizer engine 201 may gather data associated with the subset of I/O parameters for a predetermined period of time (e.g., 15, 30, 45, 60 minutes or the like). For each of applications 202A-N, a classifier may use the gathered data to characterize the application's workload with various settings, memory usage, responsiveness, etc.

Intelligent connectivity module 208 may be configured to provide intelligent and/or contextual connectivity capabilities to IHS 100. For example, module 208 may be configured by an ITDM for pre-pairing the IHS with other IHSs, specific commercial entities, or a gaming pre-pairing (e.g., at the IHS's factory), and it may include a connectivity policy and/or rule table for initiating a connectivity discovery phase in active or standby states, rules to trigger a disconnect phase, and/or other deployment rules. In some cases, intelligent connectivity module 208 may communicate with backend services 211 (e.g., to acquire new rules or policies, to utilize ML, crowdsourcing, or AI features, etc.) over cloud 210 (e.g., the Internet).

In some cases, a connectivity policy may be provided in the form of an Extensible Markup Language (XML) file or the like. Such file may be included in intelligent connectivity module 208 and/or transmitted from backend service 211 to intelligent connectivity module 208 upon initialization.

In some embodiments, a connectivity policy received and enforced by intelligent connectivity module 208 may include at least four distinct portions or sections, each portion having a distinct set of contextual rules: initialization, discovery, deployment, and disconnect. Particularly, in an initialization portion, the policy may include contextual initialization rules to pre-pair the IHS with specific entities. In the discovery portion, the policy may include contextual discovery rules for initiating the discovery phase in active or standby IHS states. In the deployment portion, the policy may include contextual deployment rules for runtime connectivity management. In the disconnect portion, the policy may include contextual disconnect rules for initiating the disconnect phase.

For example, initialization contextual rules may include service list(s), a service preference order, and/or service triggering condition(s) (e.g., throughput, bandwidth, ranging condition, etc.) of multiple applications 202A-N so that corresponding protocols such as device discovery, service discovery, and/or file transfer(s) may be sequentially followed automatically. Additionally, or alternatively, user context-based whitelisting and/or blacklisting of applications 202A-N can be additionally enabled.

When intelligent connectivity module 208 has multiple types of connectivity simultaneously available (e.g., data downloaded by infrastructure AP connection may be shared with other IHSs, printer information which received via Wi-Fi Direct may to be shared with newly encountered IHSs via Wi-Fi Aware, etc.), the initialization portion may prepare the preferred assignment of multiple applications or types of traffic across various different connections to optimize concurrent communications.

With respect to the discovery portion, any of the context information (e.g., proximity, location, calendar events, IHS posture, etc.) discussed herein may be used, alone or in combination, to trigger the start of such a phase, where an "on" state is triggered with a given frequency and/or event driven via a wireless driver or the like. Particularly, a state transition to "on" or "off" in a wireless driver through an APIs may be accompanied by setting a scan frequency, a number of simultaneous channel support, internal timing window(s), triggering proximity distance condition(s), how instantly a service is pushed or found, etc.

In some cases, discovery may be user-initiated, it may follow contextual rules (e.g., location, time-of-day, etc.), or it may be triggered by ML with context to enable state transitions from "On"→"Off" or "Off"→"On" and/or by referring to various radio configurations (e.g., screen projections to display device is needed at the same time or not, etc.). Moreover, transitions from Dual-Band Simultaneous (DBS) to single link and other links (e.g., Wi-Fi Direct, etc.) along with other DBS to non-DBS transitions may also be provided during discovery. On a radio link where an infrastructure AP connection is already working, WiFi-Aware connections may be added (whereas Wi-Fi Direct cannot).

In various embodiments, the P2P phase may be entered upon after discovery is successful to establish a decentralized P2P or mesh session. The disconnect phase may be initiated in response to intelligent connectivity module 208 detecting a context change that meets a disconnect rule (e.g., the user closing an IHS lid as determined by a hinge angle sensor, or other action such as walking away from conference room, etc.).

Backend services 211 may execute a manageability engine that communicates with intelligent connectivity module 208. In operation, during an initialization phase, backend services 211 transmit policies and/or configuration information (e.g., pairings, WiFi-Aware setting defaults, such as rules to start/stop discovery phase, etc.) to intelligent connectivity module 208. Second, during a training phase, backend services 211 may use ML and/or AI techniques to identify optimal context settings for intelligent connectivity module 208 to trigger state transitions in the discovery phase. Then, backend services 211 may push one or more trained models to intelligent connectivity module 208.

In implementations where IHS 100 is a wireless peripheral device, such as a wireless docking station, a shared display, a shared printer, etc., a firmware service may be deployed within that device to perform the aforementioned operations of intelligent connectivity module 208 (e.g., initialization, discovery, P2P, and disconnect), as well as to implement policies and/or dynamic updates of service list(s), service preference order(s), and service triggering conditions (e.g., throughput, bandwidth, ranging condition, etc.) of applications 202A-N so that corresponding protocols for the next turn can be used automatically.

FIG. 3 is a diagram illustrating an example use-case for intelligent connectivity among a plurality of IHSs 100A-N and wireless docking station 302. Particularly, wireless docking station 302 is coupled to access point (AP) 303 (e.g., via WiFi) and/or to a wired network connection (e.g., via Ethernet, Universal Serial Bus or "USB," fiber optics, etc.), from which wireless docking station 302 can access the Internet or other network. Wireless station 302 may itself operate as an AP and/or port replicator (hub), providing a simplified way of connecting a portable IHS (e.g., a laptop, tablet, mobile phone, etc.) to common peripherals (e.g., input devices 111 and/or external display 113).

In this case, three sets of IHSs 100A-N are provided in environment 300 comprising endpoints 301A-N. Particularly, in endpoint 301A, IHS 100A is in communication with input devices 111A (e.g., a wireless keyboard and mouse), as well as external displays 113AA and 113AB. In endpoint 301B, IHS 100B is in communication with input devices 111B and external displays 113BA and 113BB. And in endpoint 301N, IHS 100N is in communication with input devices 111N and external displays 113NA and 113NB.

All of input devices 111A-N are in communications with a respective one of IHSs 100A-N wirelessly, directly or indirectly (e.g., via wireless docking station 302). External displays 113BA and 113BB are in communication with IHS 100B wirelessly, and external displays 113AA and 113AB, and 113NA and 113NB are in communication with IHSs 100A and 100N via wires or cables (e.g., High-Definition Multimedia Interface or "HDMI").

Each of IHSs 100A-N is in communication with one another wirelessly either directly or via wireless docking station 302 using any suitable channel and/or protocol prescribed by its respective connectivity policy and selected in response to any prescribed combination of the aforementioned contextual information. Moreover, within each endpoint 301A-N, input devices 111A-N and external displays 113AA-NB are in wireless communications with their respective IHSs 100A-N using any suitable channel and/or protocol prescribed by its respective connectivity policy and selected in response to any prescribed combination of the aforementioned contextual information.

Figure 4:
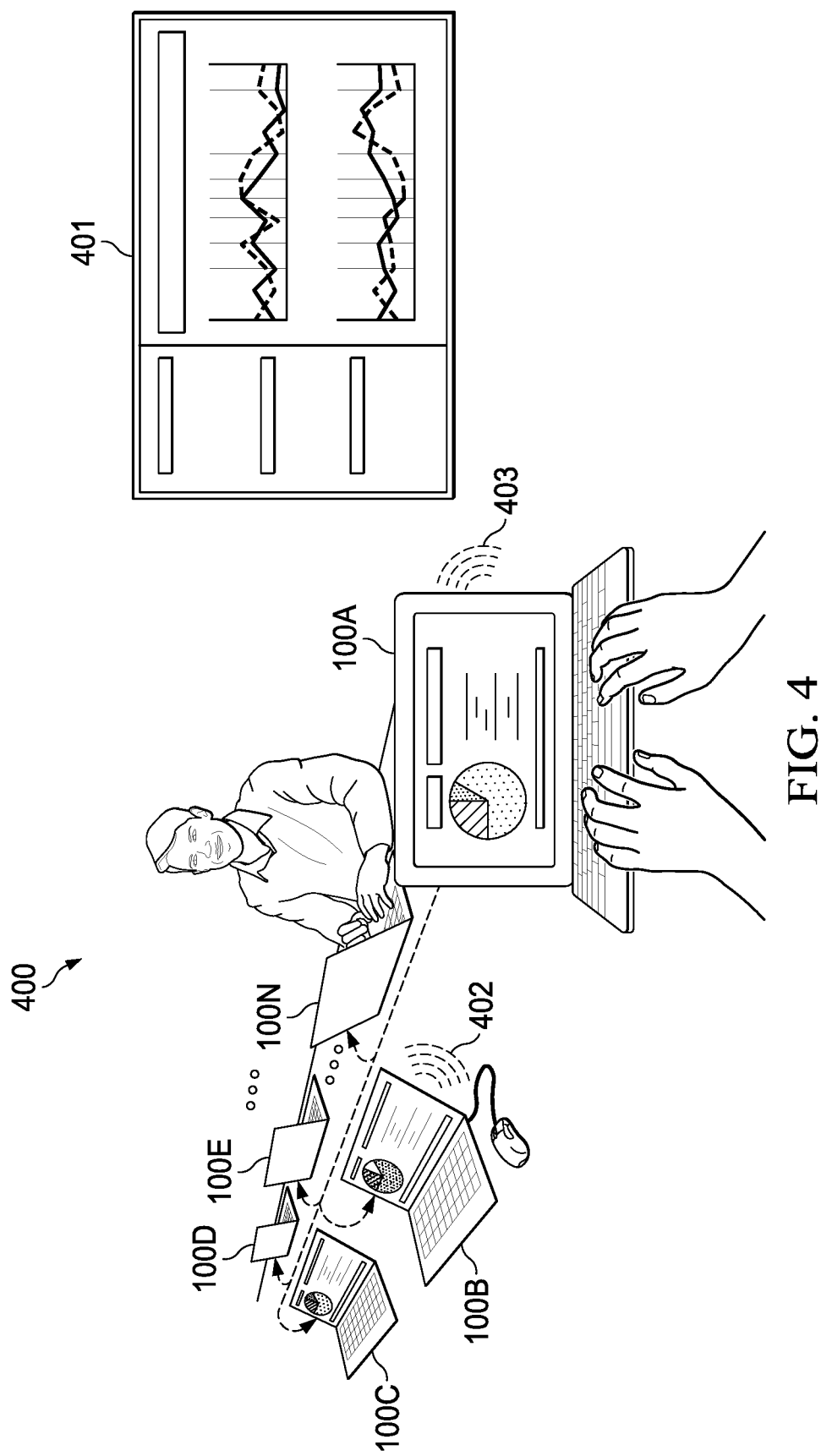
FIG. 4 is a diagram illustrating an example use-case for intelligent connectivity among a plurality of IHSs and a shared wireless display device, according to some embodiments.

FIG. 4 is a diagram illustrating an example use-case for intelligent connectivity among a plurality of IHSs 100A-N and shared wireless display device 401 in conference room 400. In some embodiments, IHSs 101A-N may be in communication with each other using a first communication channel and/or protocol 402, and IHS 100A is in communication with shared wireless display device 401 via a second communication channel and/or protocol 403. In some cases, the first and second communication channels and/or protocols 402 and 403 may be different from each other. Moreover, the first and second communication channels and/or protocols 402 and 403 may be prescribed by a respective connectivity policy, and selected response to any prescribed combination of the aforementioned contextual information.

Referring to FIGS. 3 and 4, systems and methods described herein may facilitate network prioritization, managed bandwidth throttling, traffic management, QoS arbitration, resource slicing, etc. In each of these cases, a connectivity policy may include one or more rules that, when satisfied (e.g., binary state (y/n), within a selected range, etc.) by any suitable combination of context information collected by IHS 100 (e.g., available channels/networks/protocols, number of users, location, type of room, type of IHS, IHS posture, user identification, user proximity, type of peripheral device, presence of shared display, presence of wireless docking station, application and application state, calendar or meeting information, thermal performance, battery state of charge, etc.) can change an aspect of a wireless communication channel, protocol, and/or configuration used by the IHS to connect to a wireless docking station, another IHS, a peripheral device (e.g., a use input device, a shared printer, a shared display device), an AP, etc.

For example, with respect to network prioritization, a user may be connected a secured WiFi infrastructure and establishes connection to wireless docking station 302 with a connection to a demilitarized zone (DMZ) LAN. The IHS's OS would, by default, transition network connectivity from the WiFi to the LAN due to higher bandwidth by speed identification. Using the systems and methods described herein, however, the ITDM may mandate a network connection based on system needs, capabilities, and/or context, as implemented by intelligent connectivity module 208 via an applicable connectivity policy. In other cases, the user may choose a policy or rule that connects the IHS to the best P2P connection to other IHSs of co-participants in the same meeting room based on available bandwidth, etc.

As to managed bandwidth throttling, a user may be connected to wireless docking station 302 and executing high video and network operations. The docking station becomes throttled due to thermal performance operations and the entire docking station environment is reduced to allow for active and passive management. Using systems and methods described herein, intelligent connectivity module 208 may dynamically determine which application is being prioritized, and it may reduce all usage and data transport functions to execute on the IHS to optimally balance the overall system performance, based upon policy and/or context information. Conversely, if the IHS becomes throttled, intelligent connectivity module 208 may increase all usage and data transport operations to execute on wireless docking system 302.

With respect to traffic management, using systems and methods described herein, intelligent connectivity module(s) 208 may cause network traffic to connect to wireless docking station 301 may be managed to ensure that management and administrative operations are secured and filtered appropriately to assigned ports and authenticated based on managed network deployed security keys in conjunction with user credentials. Additionally, or alternatively, P2P connections may be filtered and/or managed to be only from co-located "authenticated" users.

With respect to QoS arbitration, a user may be connected to wireless dock 302 with LAN connected to network and parallel connected to the WiFi infrastructure with below performance rates as follows: IHS WiFi network: 40 MBs; IHS WiFi to dock 302 WiFi: 50 MBs; dock 302 LAN to network: 100 MBs. By default, the OS would prioritize the identified LAN on the dock as it has highest performance capability. Using systems and methods described herein, however, intelligent connectivity module 208 may manage performance needs are based upon the actual usage of system, including gaming, network, data performance and collaboration.

Additional use cases include scenarios where multiple IHS systems are connected to the docking station for which docking station 302 network management service may arbitrate and provide segmented filtering and reduced total bandwidth capabilities. Due to bandwidth limitations of data from dock 302 WiFi to IHS WiFi, it may be advantageous to prioritize network communication from the IHS WiFi functionality and defer dock 302 network transports.

Additionally, or alternatively, a user may want to have P2P session with another user's projected content. Depending upon the QoS metric of each link, intelligent connectivity module 208 may connect the user directly to AP 303 to get a video conferencing feed, or connect to the other user directly using a P2P connection, based on context information.

As to resource slicing, a first user may be connected to wireless dock 302 with performance that allows for network communication to be sent through the dock. A second user connects to the same dock 302 and is allowed equal access to all resources (based on policy of docking station). The first user's performance is dropped in half, and, based on application needs, performance is significantly impacted. In some case, intelligent connectivity module 208 of dock 302 may modify the dock network services without direct feedback to the IHSs. It may be beneficial to understand at the IHS side if available dock resources and connectivity are reduced due to managed operations.

For all use cases identified above, systems and methods described herein provide a comprehensive and collaborative network management service, and coordinated in and out of band distribution manner, set to identify management service and functionality of connectivity stack levels at L2-L3 level for optimized user experience. Additionally, these systems and methods may extend device connectivity based on N connected IHS systems to a single resource and appropriate arbitration and restrictions while maintaining prioritized user experience.

Figure 5:
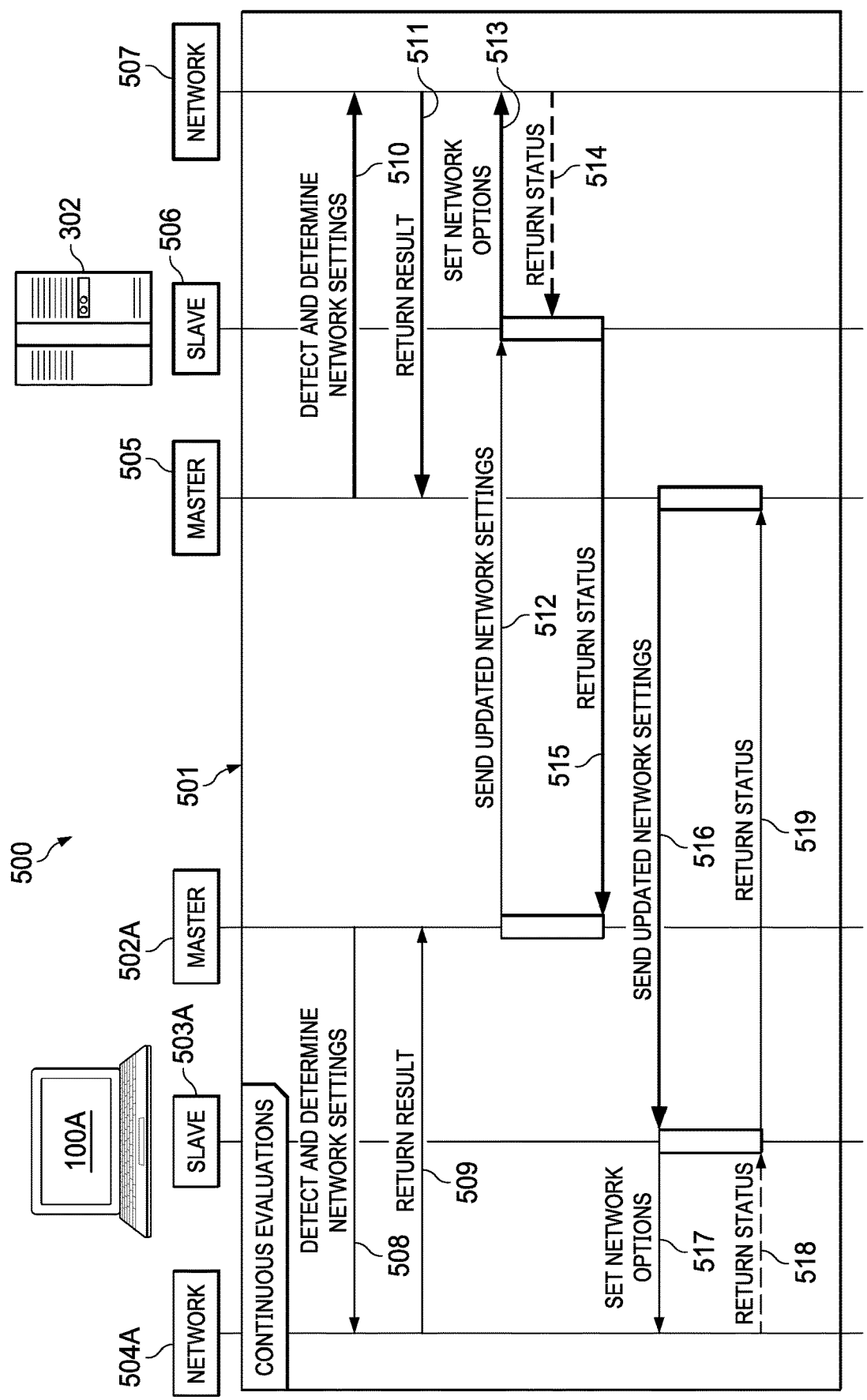
FIG. 5 is a flowchart of an example of a method for implementing intelligent connectivity between an IHS and a wireless docking station, according to some embodiments.

FIG. 5 is a flowchart of an example of method 500 for implementing intelligent connectivity between IHS 100A and wireless docking station 302. Based upon P2P demands and evaluated status, resource needs may be requested to be modified by dock 302 or IHS 100A and may be reset and negotiated dynamically. Particularly, method 500 may be performed, at least in part, through the operation of an intelligent connectivity module 208 (in IHS 100), backend services 211, and/or another module 208 deployed within wireless docking station 302 (e.g., another instance of IHS 101). In some embodiments, operations 501 may be performed as continuous evaluations and/or may be responsive to context.

At 508, IHS 100A operates in master mode 502A to detect and determine network settings from network 504A. Results are returned from network 504A to IHS 100A in master mode 502A at 509. Similarly, at 510, wireless docking station 302 operates in master mode 505 to detect and determine network settings from network 507. Results are returned from network 507 to dock 302 in master mode 505 at 511.

At 512, IHS 100A in master mode 502A sends updated network settings to wireless docking station 302 in slave mode 506. In response, using a local connectivity policy, dock 302 sets network options 513 with respect to network 507. Network 507 returns its status to dock 302 in slave mode 506 at 514. Dock 302 in slave mode 506 returns its status to IHS 100A in master mode 502A at 515. At 516, dock 302 in master mode 505 sends updated network settings to IHS 100A in slave mode 503A. IHS 100A in slave mode 503A sets network options 517 in network 504A. At 518, network 504A returns its status to IHS 100A in slave mode 503A. Then, in 519, IHS 100A in slave mode 503A returns its status to dock 302 in master mode 505.

Figure 6:
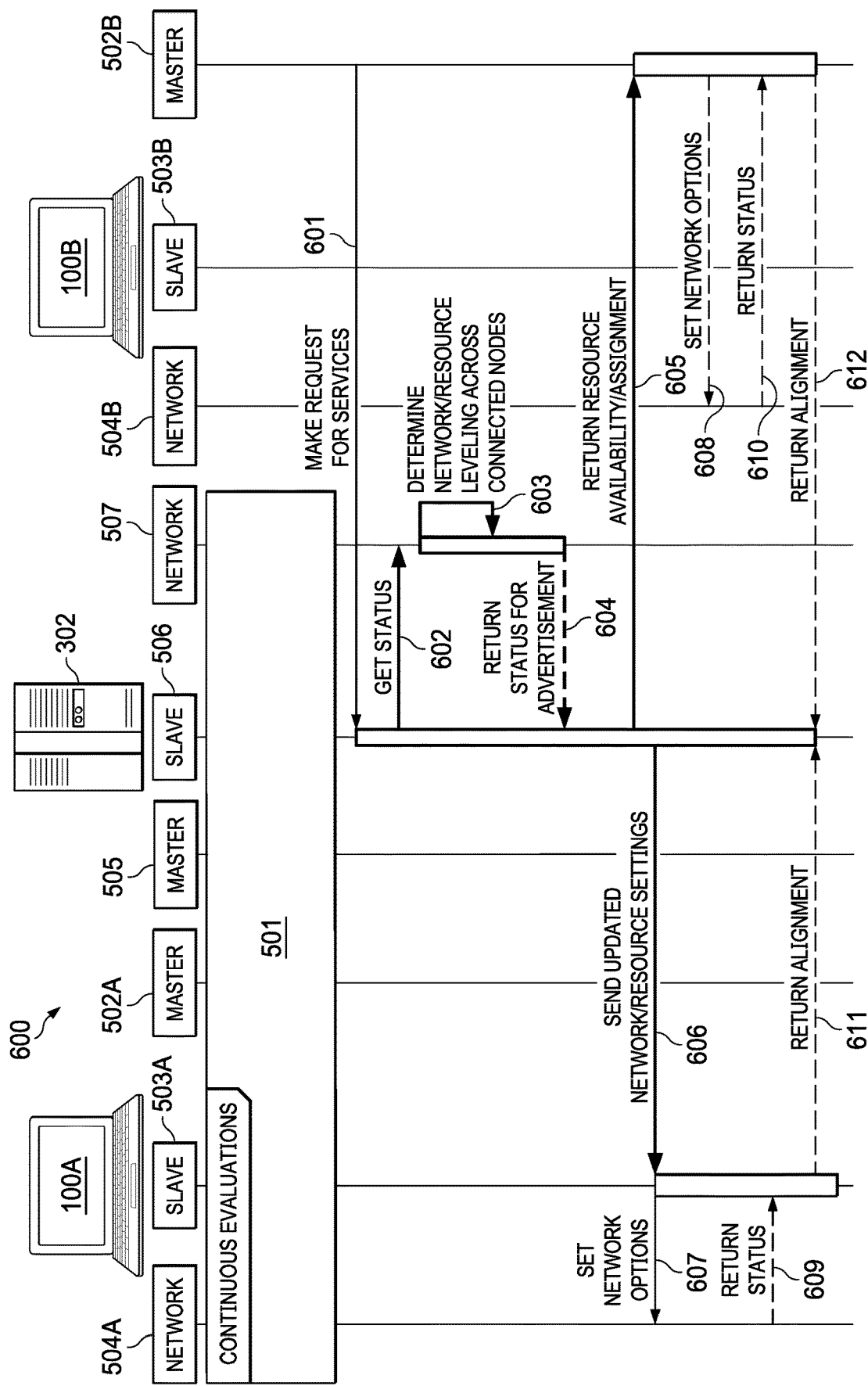
FIG. 6 is a flowchart of an example of a method for implementing intelligent connectivity between two or more IHSs and a wireless docking station, according to some embodiments.

FIG. 6 is a flowchart of an example of method 600 for implementing intelligent connectivity between two or more IHSs 100A and 100B, and wireless docking station 302. In some cases, method 600 may use intelligent connectivity module 208 as part of the docking station's logic to identify modifications to system-level resources by detecting N connections to a selected resource, and to dynamically send updates to all connected devices. In response to the identified modifications, behavior options may include even distribution (round robin), group prioritization (user/group/system), master/slave assignments, etc.

Operations 501 may be performed similarly as in FIG. 5. Then, at 601, IHS 100B may make a request for services to wireless docking station 302 in slave mode 506. At 602, dock 302 may get status information from network 507. At 603, network 507 may determine network or resource leveling across connected nodes. At 604, network 507 may return it status for advertisement to dock 302 in slave mode 506.

At 605, dock 302 in slave mode 506 returns resource availability/assignment 605 to IHS 100B in master mode 502B. At 608, IHS 100B may set network option 608 with respect to network 504A, and network 504A may return its status to IHS 100B in master mode 502B at 610. At 606, dock 302 may send updated network/resource settings 606 to IHS 100A in slave mode 503A. IHS 100A in slave mode 503A sends network options to network 504A at 607, and network 504A returns its status to IHS 100A at 609. At 611 IHS 100A in slave mode 503A returns it policy alignment information to dock 302 in slave mode 506, and at 612 IHS 100B in master mode 502B returns its alignment information to dock 302 in slave mode 506.

Figure 7:
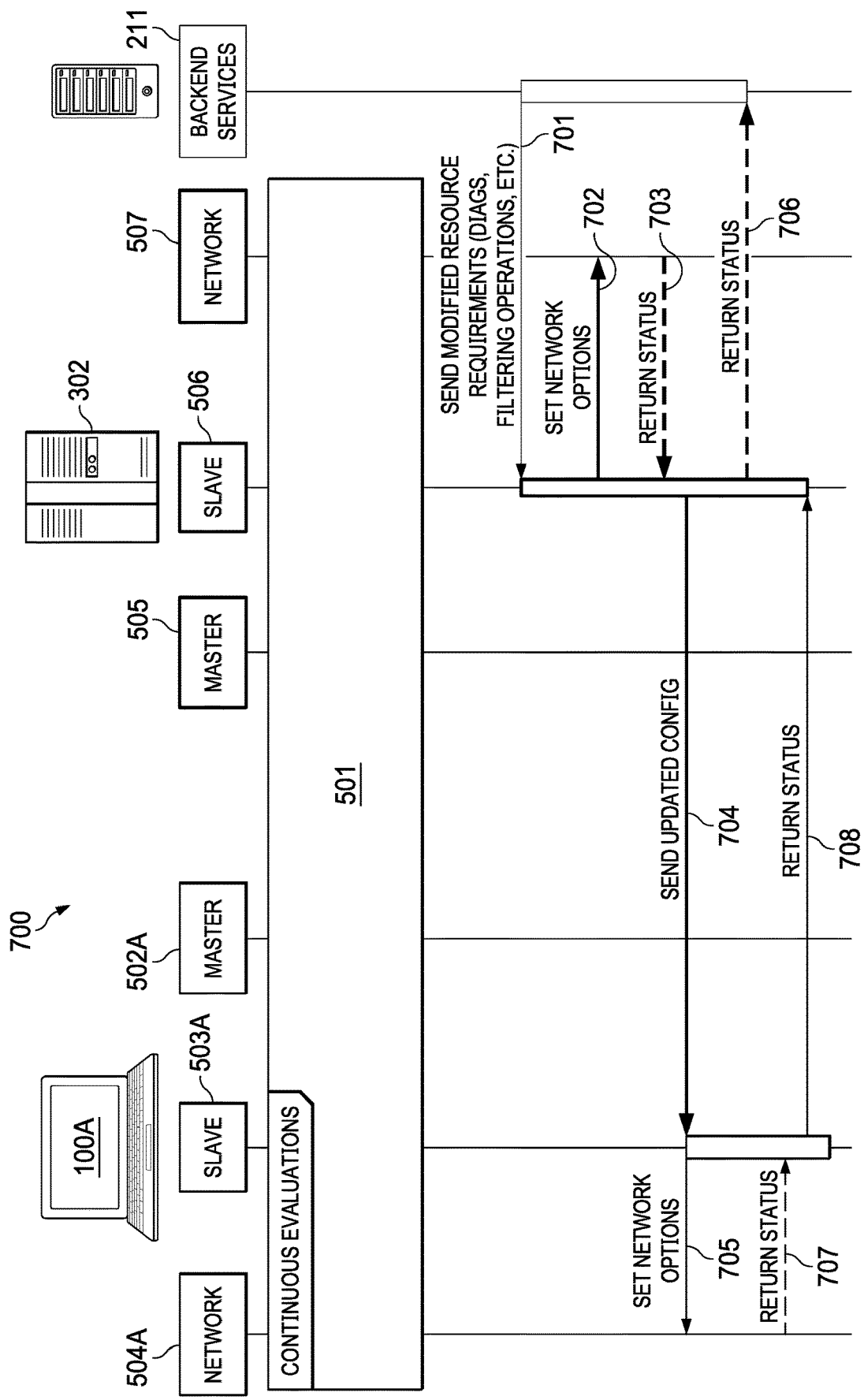
FIG. 7 is an example of a flowchart of a method for implementing intelligent connectivity between a backend server and a wireless docking station serving an IHS, according to some embodiments.

FIG. 7 is an example of a flowchart of method 700 for implementing intelligent connectivity between backend server 211 and wireless docking station 302 serving IHS 100A. In some embodiments, method 700 may enable ITDM-directed modification of docking station resources (as example of peripheral or other endpoint embodiment) in an out-of-band manner for which restrictions reduce overall resource allocation to IHS(s) to maintain improved or optimal behavior.

Operations 501 may be performed similarly as in FIG. 5. Then, at 701, backend services 211 may send modified resource requirements (e.g., diagnostics, filtering operations, etc.) to docking station 302 in slave mode 506. At 702, dock 302 in slave mode 506 may set network options with network 507. At 703, network 507 may return status information to dock 302 in slave mode 506.

At 704, dock 302 in slave mode 506 may send updated configuration information to IHS 100A in slave mode 503A. At 705, IHS 100A in slave mode 503A may set network options 705 with network 504A. At 706, dock 302 may send return status information to backend services 211. At 707, network 504A may send return status information to IHS 100A in slave mode 503A. Finally, at 708, IHS 100A in slave mode 503A may return status information to dock 302 in slave mode 506.

Accordingly, systems and methods described herein may be used to distribute dynamic network management and performance capabilities to intelligent devices for ecosystem management for multiple advanced experiences. In various embodiments, the systems and methods may provide the ability to deliver management influences to connected devices and modify peer to peer L2/L3 connectivity. Moreover, out-of-band communications may be used to scale network performance up or down based upon any combination of the aforementioned contextual information via policies individualized for each device and/or environment.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
determine that a rule prescribed by a connectivity policy is satisfied by context information collected by the IHS, wherein the connectivity policy includes at least four portions, each of the portion having a distinct set of contextual rules: (i) initialization, (ii) discovery, (iii) deployment, and (iv) disconnect, wherein the discovery portion comprises a contextual discovery rule usable to initiate a discovery phase when the IHS is in active or standby states; and
in response to the determination, change at least one of: a wireless communication channel, a protocol, or a network configuration used by the IHS to connect to a wireless docking station.

2. The IHS of claim 1, wherein the context information comprises at least one of: an identity of the user, a time-of-day, a calendar event, or a type of calendar event.

3. The IHS of claim 1, wherein the context information comprises at least one of: an application currently under execution, a duration of execution of an application, a mode of execution of an application, or a priority of an application.

4. The IHS of claim 1, wherein the context information comprises at least one of: a user's proximity to the IHS, or a location of the IHS.

5. The IHS of claim 1, wherein the context information comprises at least one of: a power mode, or a battery charge level.

6. The IHS of claim 1, wherein the context information comprises a proximity of the IHS to the wireless docking station.

7. The IHS of claim 1, wherein the context information comprises at least one of: an IHS posture, hinge angle, or lid state.

8. The IHS of claim 1, wherein the context information is collected, at least in part, via one or more hardware sensors coupled to the IHS.

9. The IHS of claim 1, wherein the program instructions, upon execution, further cause the IHS to receive the connectivity policy from a backend service over a network.

10. A method, comprising:
receiving, at a wireless docking station, a connectivity policy from a backend service over a network, wherein the wireless docking station operates in slave mode when receiving the connectivity policy from the backend services;
determining that a rule in the connectivity policy is satisfied by context information collected via one or more Information Handling Systems (IHSs) in communication with the wireless docking station; and in response to the determination, changing at least one of: a wireless communication channel, a protocol, or a network configuration used by one or more of the IHSs to connect to the wireless docking station, wherein the change occurs when the wireless docking station operates in slave mode and sends this change to the IHS operating in slave mode.

11. The method of claim 10, wherein the context information comprises at least one of: an application currently under execution, a duration of execution of an application, a mode of execution of an application, or a priority of an application.

12. The method of claim 10, wherein the context information comprises at least one of: an identity of the user, a time-of-day, a calendar event, or a type of calendar event.

13. The method of claim 10, wherein the context information comprises at least one of: a location of the wireless docking station, or a proximity of each IHS relative to the wireless docking station.

14. The method of claim 10, wherein the context information comprises at least one of: a power mode of each IHS, or a battery charge level of each IHS.

15. The method of claim 10, wherein the context information comprises at least one of: a posture, a hinge angle, or a lid state of each IHS.

16. A memory storage device having program instructions stored thereon that, upon execution by one or more processors of an Information Handling System (IHS), cause the IHS to:

receive a connectivity policy from a backend service over a network;

determine that a rule in the connectivity policy is satisfied by context information collected by the IHS, wherein the context information comprises a current posture of the IHS; and in response to the determination, change at least one of: a wireless communication channel, a protocol, or a network configuration used by the IHS to connect to a wireless display.

17. The memory storage device of claim 16, wherein the context information further comprises at least one of: an identity of the user, a time-of-day, a calendar event, or a type of calendar event.

18. The memory storage device of claim 16, wherein the context information further comprises at least one of: a user's proximity to the IHS, a location of the IHS, or a proximity of the IHS relative to the wireless display.

19. The memory storage device of claim 16, wherein the context information further comprises at least one of: a power mode of the IHS, or a battery charge level of the IHS.

20. The memory storage device of claim 16, wherein the context information further comprises at least one of: a hinge angle or lid state.

* * * * *